(12) United States Patent
Beeri

(10) Patent No.: US 9,587,680 B2
(45) Date of Patent: Mar. 7, 2017

(54) LIGHT-WEIGHT CLUTCH SUITABLE FOR MANUAL AND/OR ECONOMICAL ELECTRIC OPERATION

(71) Applicant: Shmuel Beeri, Ramat Gan (IL)

(72) Inventor: Shmuel Beeri, Ramat Gan (IL)

( * ) Notice: Subject to any disclaimer, the term of this patent is extended or adjusted under 35 U.S.C. 154(b) by 145 days.

(21) Appl. No.: 14/765,599

(22) PCT Filed: Aug. 8, 2013

(86) PCT No.: PCT/IL2013/050678
§ 371 (c)(1),
(2) Date: Aug. 4, 2015

(87) PCT Pub. No.: WO2014/045272
PCT Pub. Date: Mar. 27, 2014

(65) Prior Publication Data
US 2016/0116001 A1 Apr. 28, 2016

Related U.S. Application Data

(60) Provisional application No. 61/681,215, filed on Aug. 9, 2012.

(51) Int. Cl.
| | | |
|---|---|---|
| *F16D 11/10* | (2006.01) | |
| *F16D 11/08* | (2006.01) | |
| *F16D 11/00* | (2006.01) | |
| *F16D 1/10* | (2006.01) | |

(52) U.S. Cl.
CPC .............. F16D 11/10 (2013.01); F16D 11/08 (2013.01); *F16D 2001/102* (2013.01); *F16D 2011/002* (2013.01); *F16D 2011/006* (2013.01)

(58) Field of Classification Search
CPC ............... F16D 11/14; F16D 2011/002; F16D 2023/126; F16D 11/00–11/16
See application file for complete search history.

(56) References Cited

U.S. PATENT DOCUMENTS

| | | |
|---|---|---|
| 1,208,476 A | 12/1916 | Calwell |
| 1,540,617 A | 1/1924 | Haines |
| 1,716,154 A | 1/1928 | Schwendner |

(Continued)

FOREIGN PATENT DOCUMENTS

| | | | |
|---|---|---|---|
| EP | 0098777 | 1/1984 | |
| GB | 191313678 A | * 0/1914 | .............. F16D 11/10 |

*Primary Examiner* — Richard Lorence
*Assistant Examiner* — David Morris
(74) *Attorney, Agent, or Firm* — Robert G. Lev

(57) ABSTRACT

The present invention provides a clutch. The clutch of the invention includes a coupler, that is a ring or hollow structure surrounding a lumen. The lumen of the coupler has an engaging section and a non-engaging section. In an engaged configuration of the clutch, a driving member and a driven member are located in the engaging section of the coupler and rotation of the driving member in the engaging section generates rotation of the coupler and rotation of the coupler generates rotation of the driven member. In a disengaged configuration of the clutch, one or both of the driving member and the driven member is not located in the engaging section of the coupler and either rotation of the driving member does not generate rotation of the coupler or rotation of the coupler does not generate rotation of the driven member.

12 Claims, 7 Drawing Sheets

(56) References Cited

U.S. PATENT DOCUMENTS

| | | | | |
|---|---|---|---|---|
| 2,070,140 | A * | 2/1937 | Peterson | F16D 11/10 |
| | | | | 192/108 |
| 3,348,645 | A | 10/1967 | Sigg | |
| 3,442,361 | A * | 5/1969 | Hegar | F16D 11/14 |
| | | | | 192/109 A |
| 3,504,776 | A | 4/1970 | Misenti | |
| 5,209,333 | A * | 5/1993 | Molitor | B23F 5/16 |
| | | | | 192/108 |
| 5,394,967 | A * | 3/1995 | Bigley | B60K 17/3515 |
| | | | | 192/49 |
| 6,968,933 | B2 * | 11/2005 | Buckhouse | F16D 11/08 |
| | | | | 192/114 R |
| 7,913,951 | B2 * | 3/2011 | Barroca | F16D 11/12 |
| | | | | 244/118.6 |
| 8,919,515 | B2 * | 12/2014 | Granzow | F16H 63/304 |
| | | | | 192/69.9 |
| 9,004,250 | B2 * | 4/2015 | Mori | F16D 11/14 |
| | | | | 192/108 |
| 2013/0334000 | A1 * | 12/2013 | Gerauer | F16D 11/14 |
| | | | | 192/69.7 |
| 2013/0334001 | A1 * | 12/2013 | Albrecht | F16D 11/14 |
| | | | | 192/69.7 |
| 2016/0265601 | A1 * | 9/2016 | Mastie | F16D 27/118 |

* cited by examiner

LIGHT-WEIGHT CLUTCH SUITABLE FOR MANUAL AND/OR ECONOMICAL ELECTRIC OPERATION

PRIORITY INFORMATION

The present application claims priority as a National Stage entry of PCT/IL2013/050678, filed on Aug. 8, 2013. The present application also claims priority to U.S. Provisional Patent Application No. 61/681,215, filed on Aug. 9, 2012.

TECHNOLOGICAL FIELD

The present invention is related to mechanical devices for the intermittent transmission of torque.

PRIOR ART

References considered to be relevant as background to the presently disclosed subject matter are listed below:
 GB 753520
 U.S. Pat. No. 3,289,486
 U.S. Pat. No. 3,481,437
 U.S. Pat. No. 6,745,882

Acknowledgement of the above references herein is not to be inferred as meaning that these are in any way relevant to the patentability of the presently disclosed subject matter.

BACKGROUND

Various clutching devices are used to selectively connect mechanical components together so that they can rotate at the same angular speed about a common axis, allowing torque and power to be transmitted from one component to the other. A friction clutch contains two sets of friction plates mounted respectively to driving and driven parts. It relies on friction force to transmit torque and power. Positive engagement clutches, such as dog clutches typically include a pair of jaws directed towards each other for engaging or disengaging the driving and driven parts.

U.S. Pat. No. 6,745,882, for example, describes a locking clutch in which a toothed member and a slide assembly which are connectable to drive and driven parts. The two members are movable between an engaged position in which the clutch transfers power and/or torque to the driven part and a disengaged position in which power and/or torque is not transferred. The toothed member comprises a cylindrical surface and a plurality of teeth spaced about and extending from the cylindrical surface. The slide assembly comprises a body having a circumferential surface with a plurality of channels formed in said surface. Slide members are received in the channels to be movable between an extended position in which they can engage the teeth of the toothed member and a retracted position in which they do not engage the teeth of the toothed member. A resilient member biases the slide members to their extended positions. The slide assembly can be formed so that the slide members move either axially or radically relative to the slide assembly body.

GB Patent No. 753,520 describes a clutch wherein a shaft is moved axially to engage a first set of splines with a second set of splines. The arrangement is such that if, when engagement is attempted, the first set of splines abut against the second set of splines a ring is rotated so that the first set of splines can be guided between the second set of splines Similar devices are discloses in U.S. Pat. Nos. 3,289,486 and 3,481,437.

SUMMARY OF THE INVENTION

The present invention provides a clutch for intermittent engaging of a driving member with a driven member. The clutch comprises a ring or cylindrically shaped coupler. The inner surface of the coupler has two sections. An engaging section has a lumen configured to receive the driving member and the driven member. A non-engaging section is wider than the engaging section. The clutch has an engaged configuration in which both the driving member and the driven member are located in the engaging section of the coupler. In this configuration, rotation of the driving member transmits torque and/or power from the driving member to the coupler, and rotation of the coupler transmits torque and/or power from the coupler driving member to the driven member. The clutch has a disengaged configuration in which one or both of the driving member and the driven member is located in the non-engaging section. In this configuration rotation of the driving member either does not transfer torque or power to the driven member or rotation of the coupler does not transfer torque or power to the driven member. Passage of the clutch from the engaged configuration to the disengaged configuration is effectuated by axial movement of the coupler relative to the driving and driven members.

The clutch of the invention may be used in applications where a compact size is important and/or a battery powered motor is used and there is a weight limit on the size of the battery that can be used. Such applications include, for example, motorized wheelchairs and electric bicycles, and other situations where the motor is not in constant use.

Thus, in one of its aspects, the present invention provides a clutch comprising:
 (a) a driving member;
 (b) a driven member; the driving member and the driven member having a first non-circular cross-sectional shape; and
 (c) a coupler, the coupler being a ring or hollow structure surrounding a lumen, the lumen having an engaging section and a non-engaging section, wherein in an engaged configuration of the clutch, the driving member and the driven member are located in the engaging section of the coupler and rotation of the driving member in the engaging section generates rotation of the coupler and rotation of the coupler generates rotation of the driven member and wherein in a disengaged configuration of the clutch, one or both of the driving member and the driven member is not located in the engaging section of the coupler and either rotation of the driving member does not generate rotation of the coupler or rotation of the coupler does not generate rotation of the driven member.

The engaging section has a length that is twice as long as a length of the non-engaging section. The first non-circular cross section may be, for example, a polygonal cross-section or a circular gear having a plurality of gear teeth along a circumference of the cross section.

The driving member may be attached to a driving shaft and the driven member may be attached to a driven shaft. One or both of the driving member and the driven member may have a chamfered edge.

There may be a gap between the driven member and the driving member when the driven member and the driving member are both in the engaged section of the coupler.

The clutch may further compose means for translating the coupler axially relative to the driving member and the driven member. The means for translating the coupler may be a lever configured to move from a first position in which the clutch is in the engaged configuration and a second position in which the clutch is in the disengaged configuration. The lever may have an aperture configured to receive the coupler. The clutch may further comprise a motor configured to move the lever from the first position of the lever to the second position of the lever or from the second position of the lever to the first position of the lever. The clutch may further comprises a spring configured to move the coupler from the disengaged configuration of the clutch to the engaged configuration of the clutch. The clutch may further comprise a locking device configured to lock the lever in one or both of the first position and the second position of the lever. The clutch may further comprise a motor configured to move the lever from the first position of the lever to the second position or from the second position to the first position by a single pulse of electricity to the motor.

The coupler may be provided with one or more projections on an outer surface of the coupler, the projections being dimensioned not to pass through the aperture.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
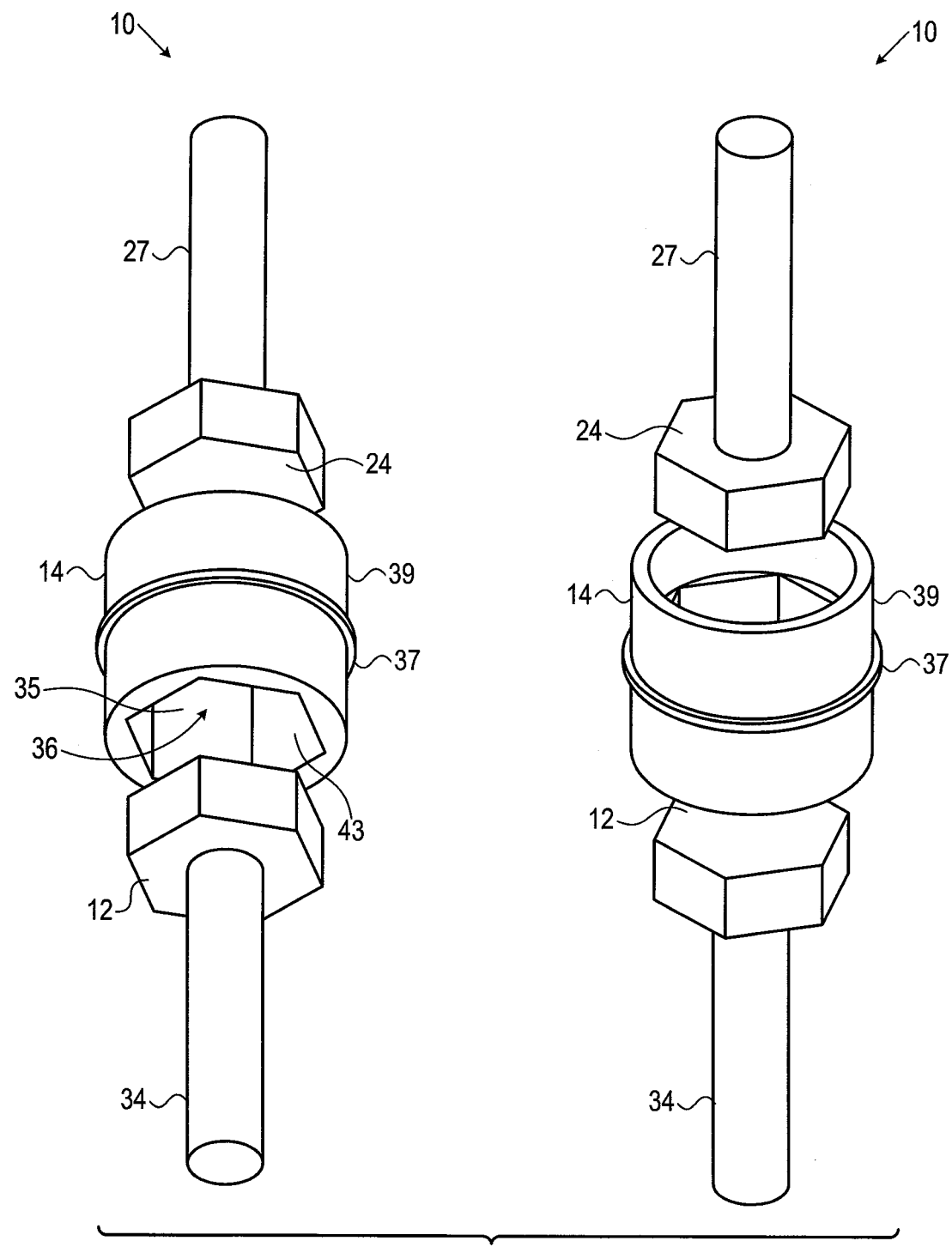
FIG. 1 shows an exploded view from two perspectives of a clutch in accordance with one embodiment of the invention.

FIG. 1 shows a clutch 10 in accordance with one embodiment of the invention in an exploded view from two different perspectives. The clutch 10 includes a driving member 12, to which a drive shaft 34 is attached, and a driven member 24 to which a driven shaft 27 is attached. In the embodiment of FIG. 1, the driving member 12 and the driven member 24 are hexagonal in shape. This is by way of example only, and the driving member 12 and the driven member 24 may have any non-circular shape. Thus, the driving member 12 and the driven member 24 may be polygonal in shape having any desired number of sides. As another example, the driving member 12 and the driven member 24 may be a circular gear having a plurality of gear teeth around their circumference. As explained below, the driving member 12, is engaged to a coupler 14 so that rotation of the driving member 12, typically by a motor (not shown in FIG. 1), transmits torque and/or power from the driving member 12 to the coupler 14. The driven member 24 intermittently engages the coupler 14, as required, to allow transmission of torque and/or power from the coupler 14 to the driven member 24.

Disengagement of the driven member 24 from the coupler 14 stops the transmission of power and/or torque from the coupler to the driven member 24. In alternate embodiments, the driving member 12 intermittently engages the coupler 14.

Figure 2:
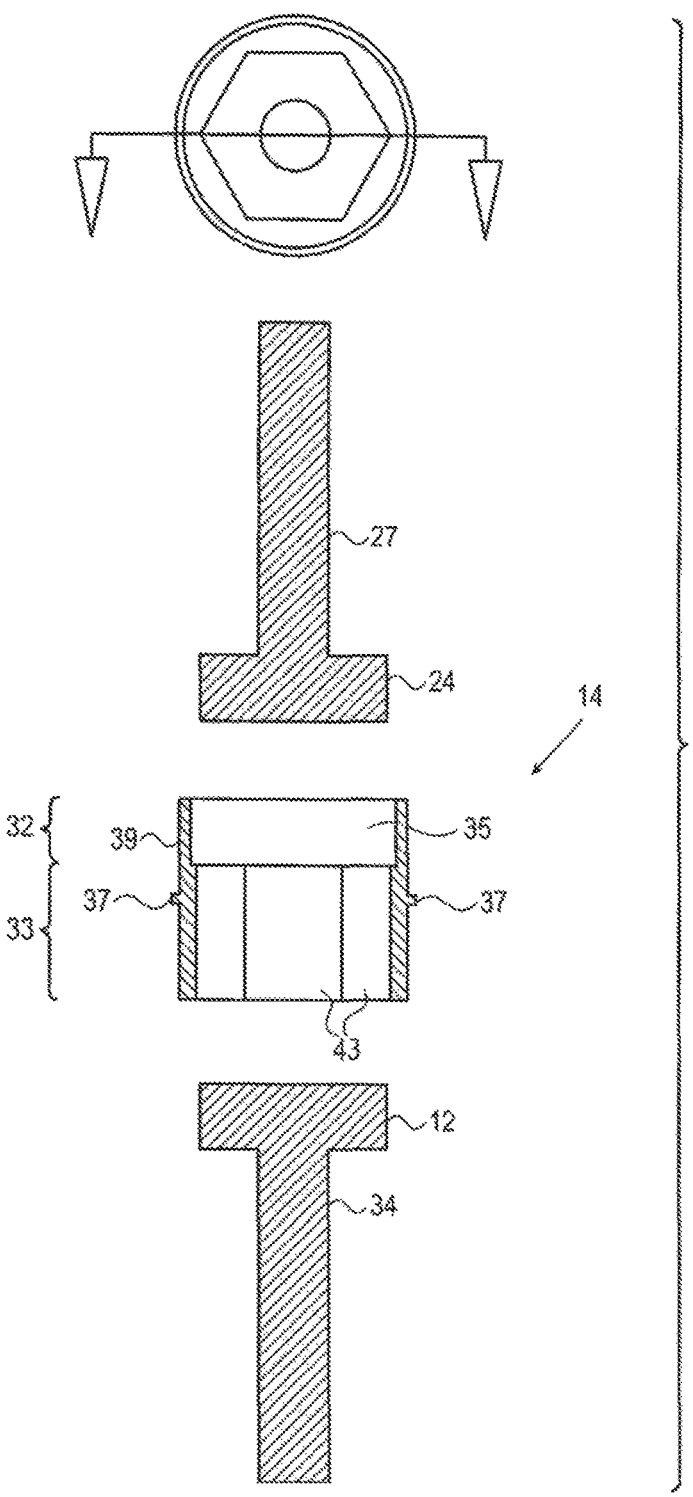
FIG. 2 shows the clutch of FIG. 1 in a cross-sectional view.

The coupler 14 is a ring or hollow cylindrical structure having an outer surface 39 and an inner surface 35 surrounding a lumen 36. A cross-sectional view of the clutch 10 in an exploded view is shown in FIG. 2. The inner surface 35 of the coupler has two sections. An engaging section 33, located closest to the driving member 12, has a lumen 43 configured to receive the driving member 21 and the driven member 24. In the present embodiment, the engaging section has a lumen 43 that is hexagonal in shape and slightly larger than the driving member 12 and the driven member 24. A non-engaging section 32 is located closest to the driven member 24 and has a circular cross section that is somewhat wider than the driven member 24. The engaging section 33 may be twice as long as the non-engaging section 32. A ring 37 is affixed to the outer surface 34 of the coupler 14 and surrounds the outside surface of the coupler in order to effectuate axial movement of the coupler, as explained below.

Figure 3A:
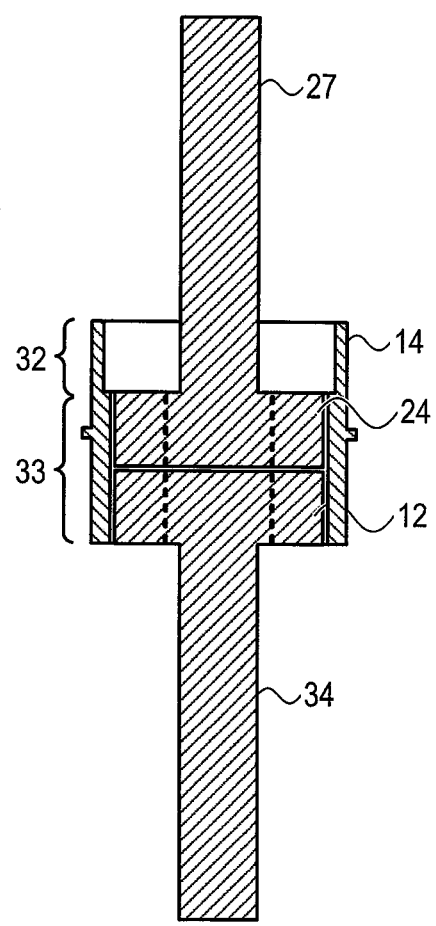
FIG. 3a shows the clutch of FIG. 1 in an engaged-configuration and FIG. 3b shows the clutch of FIGS. 1 and 2 in a disengaged configuration.
Figure 3B:
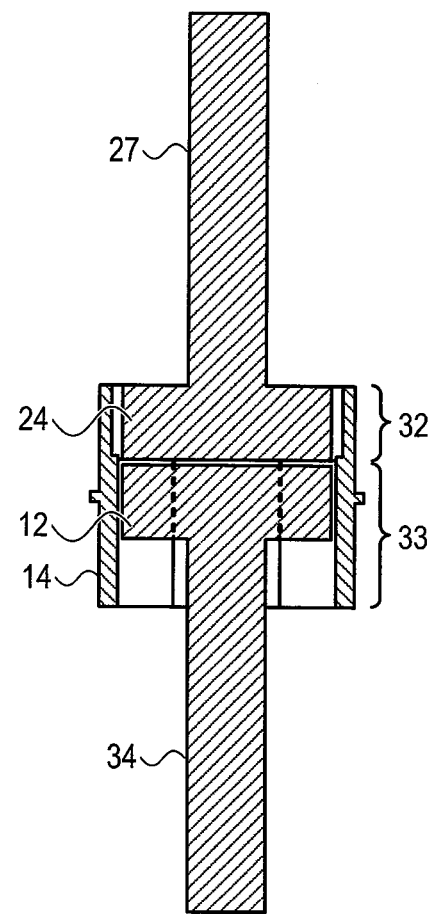
Figure 4A:
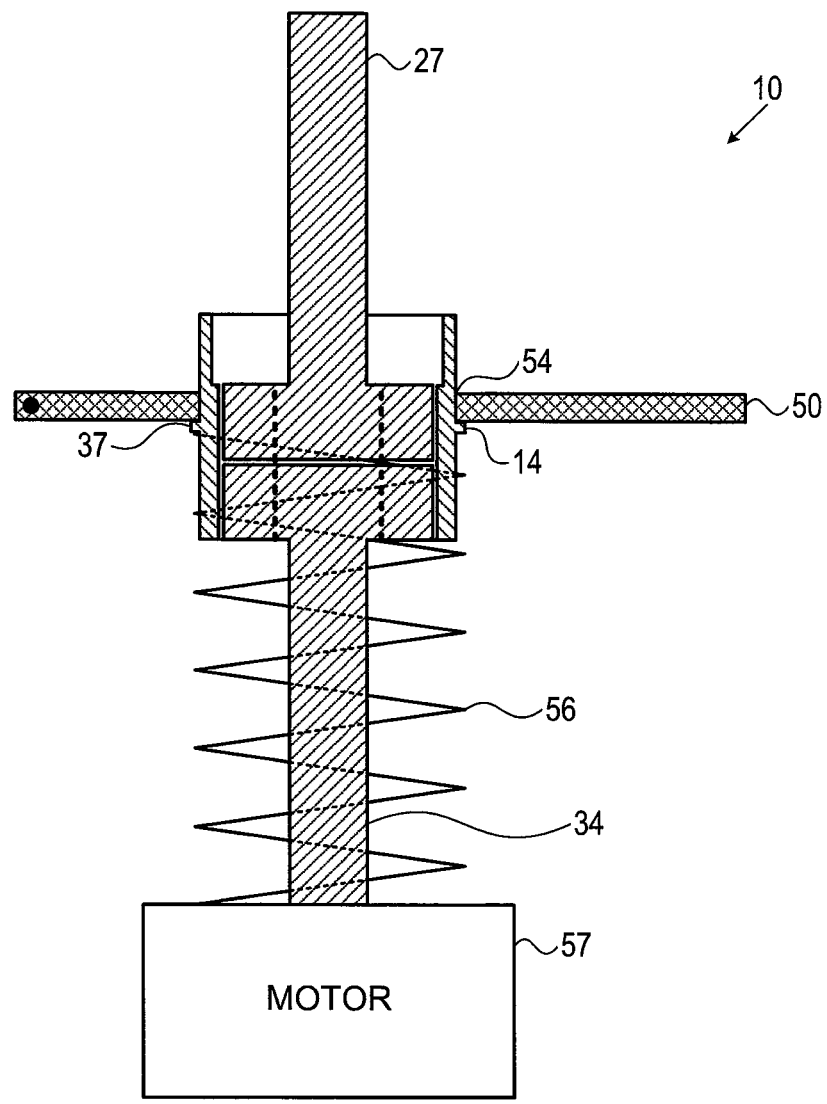
FIGS. 4a and 4b show the clutch of FIG. 1 in the engaged configuration attached to a motor.
Figure 4B:
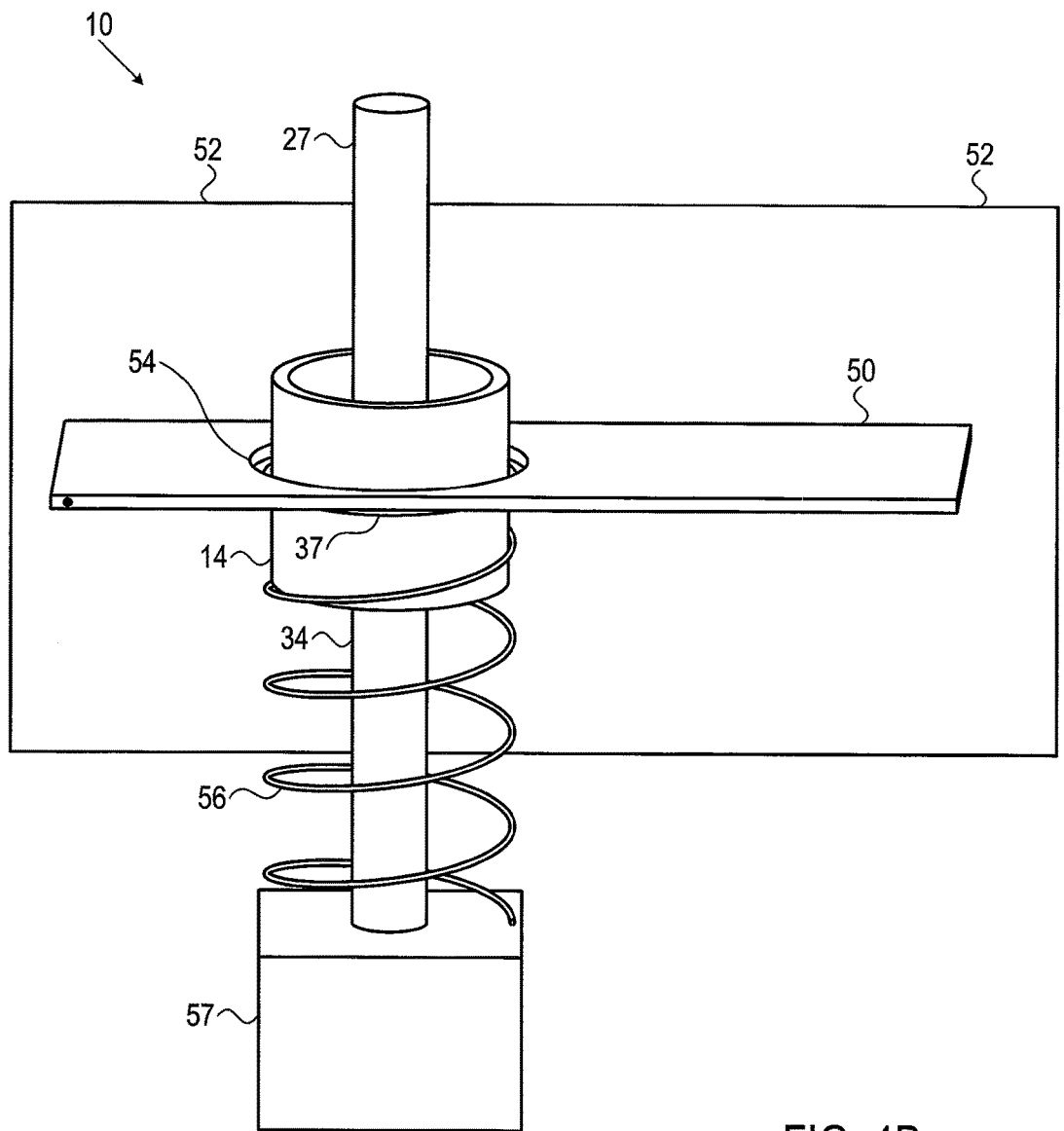
Figure 4C:
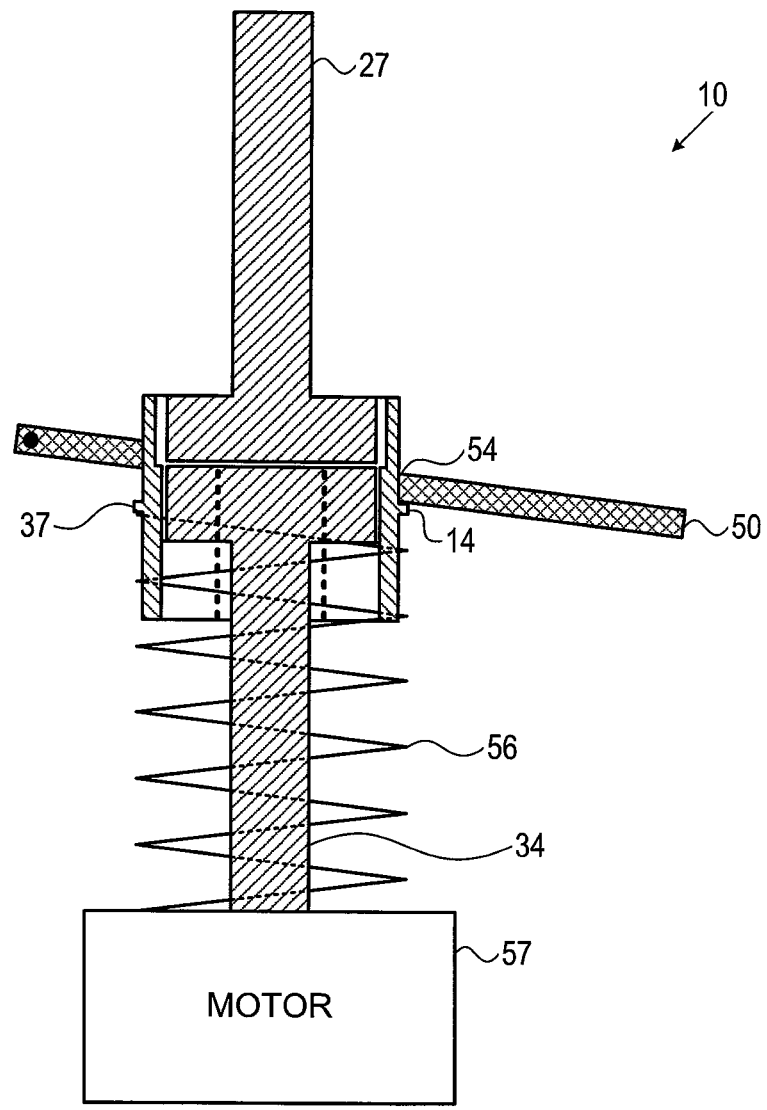
FIGS. 4c and 4d show the clutch of FIG. 1 in the disengaged configuration attached to a motor.
Figure 4D:
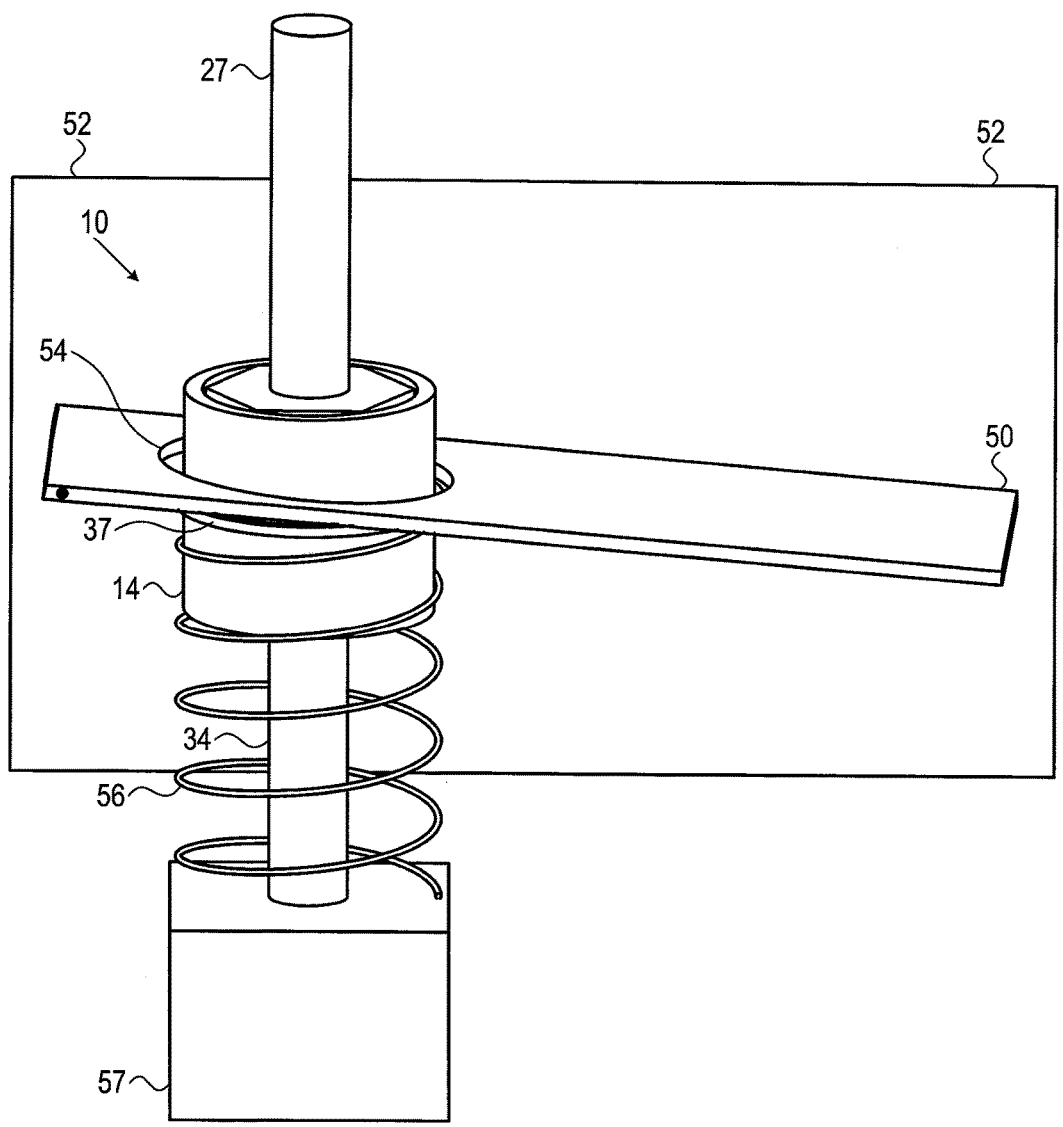

In FIG. 3, the driving member 12 and the driven member 24 are shown inside the coupler. In FIG. 3A, the clutch is in an engaged configuration in which both the hexagonal driving member 12 and the hexagonal driven member 24 are located in the hexagonal lumen of the engaging section 33 of the coupler 14. In this configuration, rotation of the driving member 12 transfers torque or power to the coupler, which in turn, transfers torque or power to the driven member 24. There is a small gap between the driving member 12 and the driven member 24 so that there is no direct transfer of torque or power from the driving member 12 to the driven member 24. Passage of the clutch 10 from the engaged configuration shown in FIG. 3A to the disengaged configuration shown in FIG. 3B occurs when the coupler 14 is shifted axially towards the driving member, without any axial movement of the driving or driven member. In the disengaged configuration, the driving member 12 is still positioned in the engaging section 33 of the coupler 14 while the driven member 24 is now positioned in the circular lumen of the non-engaging section 32. In this configuration, rotation of the driving member 12 transfers torque or power to the coupler 14. However, since the lumen of the non-engaging section 32 is circular and somewhat wider than the driving member 24, no transfer of torque or power occurs between the coupler 14 and the driven member 24. The driving member 12 is thus always positioned in the engaging section 33 of the coupler 14, while the driven member 14 is located in the engaging section 33 when the clutch is in the engaged configuration and in the non-engaging section 32 when the clutch is in the disengaged configuration. In order to facilitate insertion of the driven member 24 into the lumen of the engaging section when the clutch enters the engaged configuration from the disengaged configuration, the driven member may be chamfered on its leading edge. Similarly, the boundary between the engaging section and the non-engaging sections of the coupler may also be chamfered to facilitate insertion of the driven member 24 into the lumen of the engaging section FIG. 4 shows the assembled clutch 10 in the engaged configuration in a cross-sectional view (FIG. 4A) and in a perspective view with the driving shaft attached to a motor 57. A lever 50, pivoted to a back wall 52, is used to translate the coupler 14 axially towards the driving member 12 (downwards in the orientation of FIGS. 3 and 4). The lever 50 has an aperture 54 through which the driven shaft 27 and the coupler 14 pass freely as the lever 50 is lowered until the lever encounters the ring 37 whereupon the lever 50 presses on the ring 37 and causes the coupler 14 to descend. Lowering of the lever 50 may be accomplished manually, or by using a small motor (not shown). As the coupler 14 descends, the coupler 14 slides axially over both the driving member and the driven member until the disengaged configuration is achieved, as shown in FIGS. 4C and 4D. A locking mechanism (not shown) may be used to maintain the lever in the depressed position. When it is desired to reengage the clutch, the lever is released. A spring 56 surrounding the coupler 14 causes the coupler 14 to move upward. As the coupler 14 moves upward, the motor 57 is started. As the motor 57 just begins to rotate starting from rest, and is still rotating very slowly, the driven member 24 enters the engaging section 33 of the coupler and the clutch regains the engaged configuration shown in FIG. 2. Insertion of the driven member 24 into the engaging section 33 of the coupler 14 thus occurs while the motor 57 is still rotating relatively slowly in order to facilitate the insertion of the driven member 24 into the engaging section 33.

The integrity and stability of the clutch of the invention is maintained by the spring 56 and the lever 50, so that the clutch does not require electromagnets or other electrical devices to maintain the integrity of the clutch. When a motor is used to lower the lever 50, a single pulse of electricity is sufficient to effect lowering of the lever, so that the clutch requires electricity only when passing form the engaged configuration to the disengaged configuration. The clutch does not need any electricity when passing from the disengaged configuration to the engaged configuration, and furthermore, does not need any electricity when in either the engaged or disengaged configuration. In embodiments of the invention that utilize a motor to raise the lever, a single pulse of electricity, of the opposite polarity of the pulse that lowers the lever, may be sufficient to effect raising of the lever.

The invention claimed is:

1. A clutch comprising:
   (a) a driving member;
   (b) a driven member; the driving member and the driven member having a first non-circular cross-sectional shape; and
   (c) a coupler, the coupler being a ring or hollow structure surrounding a lumen, the lumen having an engaging section and a non-engaging section, wherein in an engaged configuration of the clutch, the driving member and the driven member are located in the engaging section of the coupler and rotation of the driving member in the engaging section generates rotation of the coupler and rotation of the coupler generates rotation of the driven member and wherein in a disengaged configuration of the clutch, one or both of the driving member and the driven member is not located in the engaging section of the coupler and either rotation of the driving member does not generate rotation of the coupler or rotation of the coupler does not generate rotation of the driven member;
   (d) a lever configured to move from a first position in which the clutch is in the engaged configuration and a second position in which the clutch is in the disengaged configuration;
   (e) a spring configured to move the lever from the second position of the lever to the first position of the lever; and
   (f) a locking device configured to lock the lever in the second position of the lever.

2. The clutch according to claim 1 wherein the engaging section has a length that is twice as long as a length of the non-engaging section.

3. The clutch according to claim 1 wherein the first non-circular cross section is a polygonal cross-section.

4. The clutch according to claim 1 wherein the first non-circular cross section is a circular gear having a plurality of gear teeth along a circumference of the cross section.

5. The clutch according to claim 1 wherein the driving member is attached to a driving shaft.

6. The clutch according to claim 1 wherein the driven member is attached to a driven shaft.

7. The clutch according to claim 1 wherein one or both of the driving member and the driven member has a chamfered edge.

8. The clutch according to claim 1, there being a gap between the driven member and the driving member when the driven member and the driving member are both in the engaged section of the coupler.

9. The clutch according to claim 1 wherein the lever has an aperture configured to receive the coupler.

10. The clutch according to claim 9 wherein the coupler is provided with one or more projections on an outer surface of the coupler, the projections being dimensioned not to pass through the aperture.

11. The clutch according claim 1 further comprising a motor configured to move the lever from the first position of the lever to the second position of the lever or from the second position of the lever to the first position of the lever.

12. The clutch according to claim 11 wherein the motor is configured to move the lever from the first position of the lever to the second position or from the second position to the first position by a single pulse of electricity to the motor.

* * * * *